(12) United States Patent
Leskinen et al.

(10) Patent No.: US 12,397,276 B2
(45) Date of Patent: Aug. 26, 2025

(54) SYSTEM FOR PRODUCING POLYOLEFIN AND PROCESS FOR RECOVERING POLYMERIZATION PRODUCT FROM GAS PHASE REACTOR

(71) Applicant: Borealis AG, Vienna (AT)

(72) Inventors: Pauli Leskinen, Porvoo (FI); Erno Elovainio, Porvoo (FI); Jouni Kivelä, Porvoo (FI); Klaus Nyfors, Porvoo (FI); Tapio Kokko, Porvoo (FI)

(73) Assignee: BOREALIS AG, Vienna (AT)

( * ) Notice: Subject to any disclaimer, the term of this patent is extended or adjusted under 35 U.S.C. 154(b) by 786 days.

(21) Appl. No.: 17/773,970

(22) PCT Filed: Dec. 3, 2020

(86) PCT No.: PCT/EP2020/084405
§ 371 (c)(1),
(2) Date: May 3, 2022

(87) PCT Pub. No.: WO2021/115908
PCT Pub. Date: Jun. 17, 2021

(65) Prior Publication Data
US 2023/0001374 A1     Jan. 5, 2023

(30) Foreign Application Priority Data
Dec. 9, 2019  (EP) ..................... 19214327

(51) Int. Cl.
*B01J 19/06* (2006.01)
*B01J 19/00* (2006.01)
(Continued)

(52) U.S. Cl.
CPC .......... *B01J 19/06* (2013.01); *B01J 19/0013* (2013.01); *C08F 10/02* (2013.01); *C08F 10/06* (2013.01);
(Continued)

(58) Field of Classification Search
USPC .................... 526/88, 901; 422/145
See application file for complete search history.

(56) References Cited

U.S. PATENT DOCUMENTS 5,382,638 A * 1/1995 Bontemps ................ B01J 8/006
                                                     526/901
6,420,498 B1 * 7/2002 Konaka .................. B01J 8/1809
                                                     422/139
(Continued)

FOREIGN PATENT DOCUMENTS

EP      2397221 A1   12/2011
WO   2008045172 A1    4/2008

OTHER PUBLICATIONS

International Search Report for PCT application No. PCT/EP2020/084405 dated Dec. 2, 2021.
(Continued)

*Primary Examiner* — Fred M Teskin
(74) *Attorney, Agent, or Firm* — Lippes Mathias LLP (57) ABSTRACT

The invention relates to a system for producing polyolefin. The system comprises a gas phase reactor (1) for polymerizing an olefin to obtain polymerization product. The gas phase reactor (1) comprises a gas distribution plate (11) arranged inside the gas phase reactor (1); a first outlet (12) for continuously withdrawing polymerization product from the gas phase reactor (1) as a first product stream, the first outlet (12) being arranged above the gas distribution plate (11); and a second outlet (13) for continuously withdrawing polymerization product from the gas phase reactor (1) as a second product stream, the second outlet (13) being arranged above the gas distribution plate (11). The system further comprises a first outlet tank (2) in fluid communication with the first outlet (12) via a first passage (22), wherein the first passage (22) comprises a first valve means
(Continued)

(221) for controlling the flow of the first product stream in the first passage (22) and wherein the first outlet tank (2) is arranged to receive the first product stream and to concentrate the first product stream; a product receiver tank (3) in fluid communication with the second outlet (13) via a second passage (31), wherein the second passage (31) comprises a second valve means (311) for controlling the flow of the second product stream in the second passage (31), and wherein the product receiver tank (3) is arranged to receive the second product stream; and a control means in communication with the first valve means (221) and the second valve means (311) and arranged to control the operation of the first valve means (221) and the second valve means (311) so that flow in only one of the first passage (22) and the second passage (31) is allowed at a time.

The invention relates also to a process for recovering polymerization product from a gas phase reactor (1). The gas phase reactor (1) is suitable for polymerizing an olefin to obtain polymerization product and comprises a gas distribution plate (11) arranged inside the gas phase reactor (1); a first outlet (12) for continuously withdrawing polymerization product from the gas phase reactor (1), the first outlet (12) being arranged above the gas distribution plate (11); and a second outlet (13) for continuously withdrawing polymerization product from the gas phase reactor (1), the second outlet (13) being arranged above the gas distribution plate (11). The process comprises selectively withdrawing polymerization product from the gas phase reactor (1) via the first outlet (12) as a first product stream, feeding the first product stream to a first outlet tank (2), and concentrating the first product stream in the first outlet tank (2); or withdrawing polymerization product from the gas phase reactor (1) via the second outlet (13) as a second product stream, and feeding the second product stream to a product receiver tank (3).

14 Claims, 3 Drawing Sheets

(51) Int. Cl.
  *C08F 2/34* (2006.01)
  *C08F 10/02* (2006.01)
  *C08F 10/06* (2006.01)
(52) U.S. Cl.
  CPC ............... *B01J 2219/00029* (2013.01); *B01J 2219/00159* (2013.01); *B01J 2219/00164* (2013.01)

(56) References Cited

U.S. PATENT DOCUMENTS

| | | |
|---|---|---|
| 6,472,483 B1 | 10/2002 | Goode |
| 2011/0124826 A1 | 5/2011 | Savatsky |

OTHER PUBLICATIONS

Hearing Notice: POC/Application No. /202217018236 Date: Mar. 3, 2024.

* cited by examiner

SYSTEM FOR PRODUCING POLYOLEFIN AND PROCESS FOR RECOVERING POLYMERIZATION PRODUCT FROM GAS PHASE REACTOR

CROSS-REFERENCE TO RELATED APPLICATIONS

This application is a 371 of PCT application No. PCT/EP2020/084405, filed on Dec. 3, 2020, which claims priority to European Patent Application No. 19214327.9 filed on Dec. 9, 2019 and entitled "SYSTEM FOR PRODUCING POLYOLEFIN AND PROCESS FOR RECOVERING POLYMERIZATION PRODUCT FROM GAS REACTOR," the disclosure of which is herein incorporated by reference in its entirety.

FIELD OF THE INVENTION

The present invention relates to producing polyolefin, and particularly to a system for producing polyolefin. The present invention relates also to a process for recovering polymerization product from a gas phase reactor.

BACKGROUND OF THE INVENTION

The polymer product outlet from the gas phase reactor(s) (GPR) is very essential and critical place from the plant operability point of view. Malfunction or plugging of the outlet system means typically shut down of the whole plant, which leads to enormous productivity losses and to the possible safety risks.

Document WO 00/29452 discloses a method and an apparatus of discharging polymer from a continuously operated gas phase reactor, wherein at least one monomer is polymerized in a bed containing active catalyst formed by catalyst and polymer particles suspended in a fluid, the bed defining a fluidized bed level in said reactor. The method comprises continuously withdrawing polymer powder from the reactor and adjusting the discharge rate of the polymer powder to maintain a constant bed level during polymerization.

Document EP 2 330 135 A1 discloses a process of producing a polymer of at least one olefin in two consecutive reactors in gas phase in the presence of an olefin polymerisation catalyst where an olefin is polymerised in a first polymerization reactor in the presence of an olefin polymerisation catalyst and a first reaction gas mixture to form a fluidized bed comprising an olefin polymer and said first reaction gas mixture. The first reaction gas mixture together with the olefin polymer is continuously or intermittently withdrawn from the first polymerisation reactor and directed into a separation vessel so that a bed of polymer is formed in said separation vessel. A portion of said first reaction gas mixture is withdrawn from said separation vessel and returned into the first polymerization reactor to a point where the pressure is lower than in the separation vessel. The olefin polymer is withdrawn from said separation vessel to form a second product stream and the second product stream is directed into a second polymerization reactor. A second gas may be introduced into the bottom part of the separation vessel to avoid the carry-over of the reactants from the first polymerisation stage into the second polymerisation stage.

A problem with the solutions described in the above documents is that they include only one outlet, which may be continuous. The one outlet is susceptible to plugging despite efforts minimizing the risk.

BRIEF DESCRIPTION OF THE INVENTION

An object of the present invention is to provide a system and a process to overcome the above problems.

The object of the invention is achieved by a system and a process, which are characterized by what is stated in the independent claims. The preferred embodiments of the invention are disclosed in the dependent claims.

The invention is based on the idea of providing a system for producing polyolefin, comprising a gas phase reactor for polymerizing an olefin to obtain polymerization product, the gas phase reactor comprising
- a gas distribution plate arranged inside the gas phase reactor;
- a first outlet for continuously withdrawing polymerization product from the gas phase reactor as a first product stream, the first outlet being arranged above the gas distribution plate; and
- a second outlet for continuously withdrawing polymerization product from the gas phase reactor as a second product stream, the second outlet being arranged above the gas distribution plate;

wherein the system further comprises
- a first outlet tank in fluid communication with the first outlet via a first passage, wherein the first passage comprises a first valve means for controlling the flow of the first product stream in the first passage and wherein the first outlet tank is arranged to receive the first product stream and to concentrate the first product stream;
- a product receiver tank in fluid communication with the second outlet via a second passage, wherein the second passage comprises a second valve means for controlling the flow of the second product stream in the second passage, and wherein the product receiver tank is arranged to receive the second product stream; and
- a control means in communication with the first valve means and the second valve means and arranged to control the operation of the first valve means and the second valve means so that flow in only one of the first passage and the second passage is allowed at a time;

as well as providing a process for recovering polymerization product from a gas phase reactor, the gas phase reactor being suitable for polymerizing an olefin to obtain polymerization product and comprising
- a gas distribution plate arranged inside the gas phase reactor;
- a first outlet for continuously withdrawing polymerization product from the gas phase reactor, the first outlet being arranged above the gas distribution plate; and
- a second outlet for continuously withdrawing polymerization product from the gas phase reactor, the second outlet being arranged above the gas distribution plate;

wherein the process comprises selectively
- withdrawing polymerization product from the gas phase reactor via the first outlet as a first product stream, feeding the first product stream to a first outlet tank, and concentrating the first product stream in the first outlet tank; or
- withdrawing polymerization product from the gas phase reactor via the second outlet as a second product stream, and feeding the second product stream to a product receiver tank.

An advantage of the system and the process of the invention is that it allows a good operability and reliable operation due to the existence of two continuous outlets. This allows having one outlet in operation and the other outlet as a spare. In case of plugging an outlet, another continuous outlet can quickly be taken into use. The system and the process of the invention allows also an accurate control of the polymer outlet and a stable bed level control in the GPR.

BRIEF DESCRIPTION OF THE DRAWINGS

In the following the invention will be described in detail by means of preferred embodiments with reference to the accompanying drawings, in which.

DETAILED DESCRIPTION OF THE INVENTION

The invention relates to a system for producing polyolefin. The invention relates also to a process for recovering polymerization product from a gas phase reactor. According to an embodiment of the invention, the olefin is ethylene and correspondingly the polyolefin is polyethylene. According to an alternative embodiment of the invention, the olefin is propylene and correspondingly the polyolefin is polypropylene.

The system comprises a gas phase reactor 1. The gas phase reactor 1 is suitable for polymerizing an olefin to obtain polymerization product. Preferably, the gas phase reactor 1 is operated continuously. Preferably, the gas phase reactor 1 is a fluidized bed gas phase reactor. For example, the gas phase reactor 1 has a diameter of 2.9 to 5.5 m. Preferably, the gas phase reactor 1 has a circular cross-section. More preferably, the gas phase reactor 1 has an essentially cylindrical form.

The gas phase reactor 1 comprises a gas distribution plate 11 arranged inside the gas phase reactor 1. In the fluidized bed gas phase reactor, an olefin is polymerized in the presence of polymerization catalyst in an upwards moving gas stream. The reactor typically contains a fluidized bed comprising the growing polymer particles containing the active catalyst located above a distribution plate.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow-dividing element as known in the art, e.g. U.S. Pat. No. 4,933,149 A and EP 684871 A. One or more of the above-mentioned components may be continuously added into the fluidization gas to compensate for losses caused, among other, by reaction or product withdrawal.

From the inlet chamber, the gas flow is passed upwards through the gas distribution 11 plate into the fluidized bed. The purpose of the distribution plate is to divide the gas flow evenly through the cross-sectional area of the bed. Sometimes the distribution plate may be arranged to establish a gas stream to sweep along the reactor walls, as disclosed in WO 2005/087361 A. Other types of distribution plates are disclosed, among others, in U.S. Pat. No. 4,578,879 A, EP 600414 and EP 721798 A. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport; as otherwise, the whole bed would be entrained with the fluidization gas. The minimum fluidization velocity and the onset velocity of pneumatic transport can be calculated when the particle characteristics are known by using common engineering practise. An overview is given, among others, in Geldart: Gas Fluidization Technology, J. Wiley & Sons, 1986.

When the fluidization gas is contacted with the bed containing the active catalyst, the reactive components of the gas, such as monomers and chain transfer agents, react in the presence of the catalyst to produce the polymer product. At the same time, the gas is heated by the reaction heat.

The unreacted fluidization gas is removed from the top of the reactor and cooled in a heat exchanger to remove the heat of reaction. The gas is cooled to a temperature, which is lower than that of the bed to prevent the bed from heating because of the reaction. It is possible to cool the gas to a temperature where a part of it condenses. When the liquid droplets enter the reaction zone, they are vaporised. The vaporisation heat then contributes to the removal of the reaction heat. This kind of operation is called condensed mode and variations of it are disclosed, among others, in WO 2007/025640 A, U.S. Pat. No. 4,543,399 A, EP 699213 A and WO 94/25495 A. It is also possible to add condensing agents into the recycle gas stream, as disclosed in EP 696293 A. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor, fresh reactants are introduced into the fluidization gas stream to compensate for the losses caused by the reaction and product withdrawal. It is generally known to analyse the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO 01/05845 A and EP 499759 A disclose such methods. Where the gas phase reactor is a part of a reactor cascade, the catalyst is usually dispersed within the polymer particles from the preceding polymerization stage. The polymer particles may be introduced into the gas phase reactor as disclosed in EP 1415999 A and WO 00/26258 A. Especially, if the preceding reactor is a slurry reactor, it is advantageous to feed the slurry directly into the fluidized bed of the gas phase reactor as disclosed in EP 887379 A, EP 887380 A, EP 887381 A and EP 991684 A.

The top part of the gas phase reactor may include a so-called disengagement zone. In such a zone, the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Antistatic agent(s) may also be introduced into the gas phase reactor if needed. Suitable antistatic agents and methods to use them are disclosed, among others, in U.S. Pat. Nos. 5,026,795 A, 4,803,251 A, 4,532,311 A, 4,855,370 and EP 560035 A. They are usually polar compounds and include, among others, water, ketones, aldehydes and alcohols.

The reactor may also include a mechanical agitator to facilitate mixing within the fluidized bed. An example of suitable agitator design is given in EP 707513 A.

Typically, the gas phase reactor 1 is operated at a temperature within the range of from 50 to 100° C., preferably from 65 to 90° C. The pressure is suitably from 10 to 40 bar, preferably from 15 to 30 bar.

The gas phase reactor 1 comprises a first outlet 12. The purpose of the first outlet 12 is to withdraw polymerization product continuously from the gas phase reactor 1 as a first product stream. The first outlet 12 is arranged above the gas distribution plate 11. If the polyolefin is polyethylene, the distance between the first outlet 12 and the gas distribution plate 11 is preferably 55 to 345%, such as 100 to 185%, of the diameter of the gas phase reactor 1 at the level of the first outlet 12, or 3 to 10 m. If the polyolefin is polypropylene, the distance between the first outlet 12 and the gas distribution plate 11 is preferably 1 to 17%, such as 2 to 10%, of the diameter of the gas phase reactor 1 at the level of the first outlet 12, or 0.05 to 0.5 m. Preferably, the first outlet has a diameter of 10 to 40 cm, more preferably 15 to 26 cm. In this document, the location of an outlet is measured from the centre of the outlet.

The gas phase reactor 1 comprises a second outlet 13. The purpose of the second outlet 13 is to withdraw polymerization product continuously from the gas phase reactor 1 as a second product stream. The second outlet 13 is arranged above the gas distribution plate 11. If the polyolefin is polyethylene, the distance between the second outlet 13 and the gas distribution plate 11 is preferably 55 to 345%, such as 100 to 185%, of the diameter of the gas phase reactor 1 at the level of the second outlet 13, or 3 to 10 m. If the polyolefin is polypropylene, the distance between the second outlet 13 and the gas distribution plate 11 is preferably 1 to 17%, such as 2 to 10%, of the diameter of the gas phase reactor 1 at the level of the second outlet 13, or 0.05 to 0.5 m. Preferably, the second outlet 13 has a diameter of 3 to 15 cm, more preferably 5 to 12 cm.

In normal operation, the polymer product is withdrawn from the gas phase reactor 1 through the first outlet 12. Thus, the second outlet is normally as a spare.

The system comprises a first outlet tank 2. The first outlet tank 2 is in fluid communication with the first outlet 12 via a first passage 22. The first passage 22 comprises a first valve means 221 for controlling the flow of the first product stream in the first passage 22. For example, the first valve means 221 is arranged to be set only to an open position, in which the flow of the first product stream in the first passage 22 is allowed, and to a closed position, in which the flow of the first product stream in the first passage 22 is prevented. Alternatively, the first valve means 221 is arranged to be set to the open position, to the closed position or any position between the open position and closed position for more precise controlling of the flow of the first product stream in the first passage 22. The first outlet tank 2 is arranged to receive the first product stream withdrawn from the gas phase reactor 1 and to concentrate the first product stream. According to an embodiment of the invention, the first outlet tank 2 comprises a screen 21 for removing agglomerates from the first product stream. According to an embodiment, the first outlet tank 2 is in fluid connection with a downstream treatment device, such as a further gas phase reactor.

The system comprises a product receiver tank 3. The product receiver tank 3 is in fluid communication with the second outlet 13 via a second passage 31. The second passage comprises a second valve means 311 for controlling the flow of the second product stream in the second passage 31. For example, the second valve means 311 is arranged to be set only to an open position, in which the flow of the second product stream in the second passage 31 is allowed, and to a closed position, in which the flow of the second product stream in the second passage 31 is prevented. Alternatively, the second valve means 311 is arranged to be set to the open position, to the closed position or any position between the open position and closed position for more precise controlling of the flow of the second product stream in the second passage 31. The product receiver tank 3 is arranged to receive the second product stream withdrawn from the gas phase reactor 1. According to an embodiment, the product receiver tank 3 is in fluid connection with the first outlet tank 2, for example via line 33, for receiving optionally screened first product stream from the first outlet tank 2. According to an embodiment, the product receiver tank 3 is in fluid connection with a downstream treatment device, such as a further gas phase reactor.

The system comprises a control means (not shown in the figures) that is in communication with the first valve means 221 and the second valve means 311. The control means is arranged to control the operation of the first valve means 221 and the second valve means 311 so that flow in only one of the first passage 22 and the second passage 31 is allowed at a time. In other words, the control means ensure that only one of the first valve means 221 and the second valve means 311 is in an open position at a time and that the other of the first valve means 221 and the second valve means 311 is in a closed position. The purpose of the control means is to ensure that a product stream is withdrawn through only one outlet at a time.

The process comprises selectively
  withdrawing polymerization product from the gas phase reactor 1 via the first outlet 12 as the first product stream, feeding the first product stream to the first outlet tank 2 and concentrating the first product stream in the first outlet tank 2; or
  withdrawing polymerization product from the gas phase reactor 1 via the second outlet 13 as the second product stream and feeding the second product stream to a product receiver tank 3.

The selective withdrawal of polymerization product via the first outlet 12 or the second outlet 13 is enabled by the control means.

The gas phase reactor 1 comprises a third outlet 14. The purpose of the third outlet 14 is to withdraw polymerization product continuously from the gas phase reactor 1 as a third product stream. The third outlet 14 allows a further option for withdrawing the polymerization product from the gas phase reactor 1 in case one of the other outlets is blocked.

The third outlet 14 is arranged above the second outlet 13. If the polyolefin is polyethylene, the distance between the third outlet 14 and the gas distribution plate 11 is preferably 105 to 485%, such as 205 to 255%, of the diameter of the gas phase reactor 1 at the level of the third outlet 14, or 6 to 14 m. If the polyolefin is polypropylene, the distance between the third outlet 14 and the gas distribution plate 11 is preferably 9 to 105%, such as 15 to 55%, of the diameter of the gas phase reactor 1 at the level of the third outlet 14, or 0.5 to 3 m. The product receiver tank 3 is in fluid communication with the third outlet 14 via a third passage 32 and arranged to receive the third product stream.

The third passage 32 comprises a third valve means 321 for controlling the flow of the third product stream in the third passage 32. The control means is in communication with the third valve means 321. The control means is arranged to control the operation of the first valve means 221, the second valve means 311 and the third valve means 321 so that flow in only one of the first passage 22, the second passage 31 and the third passage 32 is allowed at a time. In other words, the control means ensure that only one of the first valve means 221, the second valve means 311 and the third valve means 321 is in an open position at a time and that the other of the first valve means 221, the second valve means 311 and the third valve means 321 is in a closed position. Also in this embodiment, the purpose of the control means is to ensure that a product stream is withdrawn through only one outlet at a time. Preferably, the third outlet 14 has a diameter of 7 to 8 cm.

The process comprises selectively
  withdrawing polymerization product from the gas phase reactor (1) via the first outlet (12) as a first product stream, feeding the first product stream to a first outlet tank (2) and concentrating the first product stream in the first outlet tank (2);
  withdrawing polymerization product from the gas phase reactor (1) via the second outlet (13) as a second product stream and feeding the second product stream to a product receiver tank (3); or
  withdrawing polymerization product from the gas phase reactor (1) via the third outlet (14) as a third product stream and feeding the second product stream to a product receiver tank (3).

The selective withdrawal of polymerization product via the first outlet 12, the second outlet 13 or the third outlet 14 is enabled by the control means.

Figure 1:
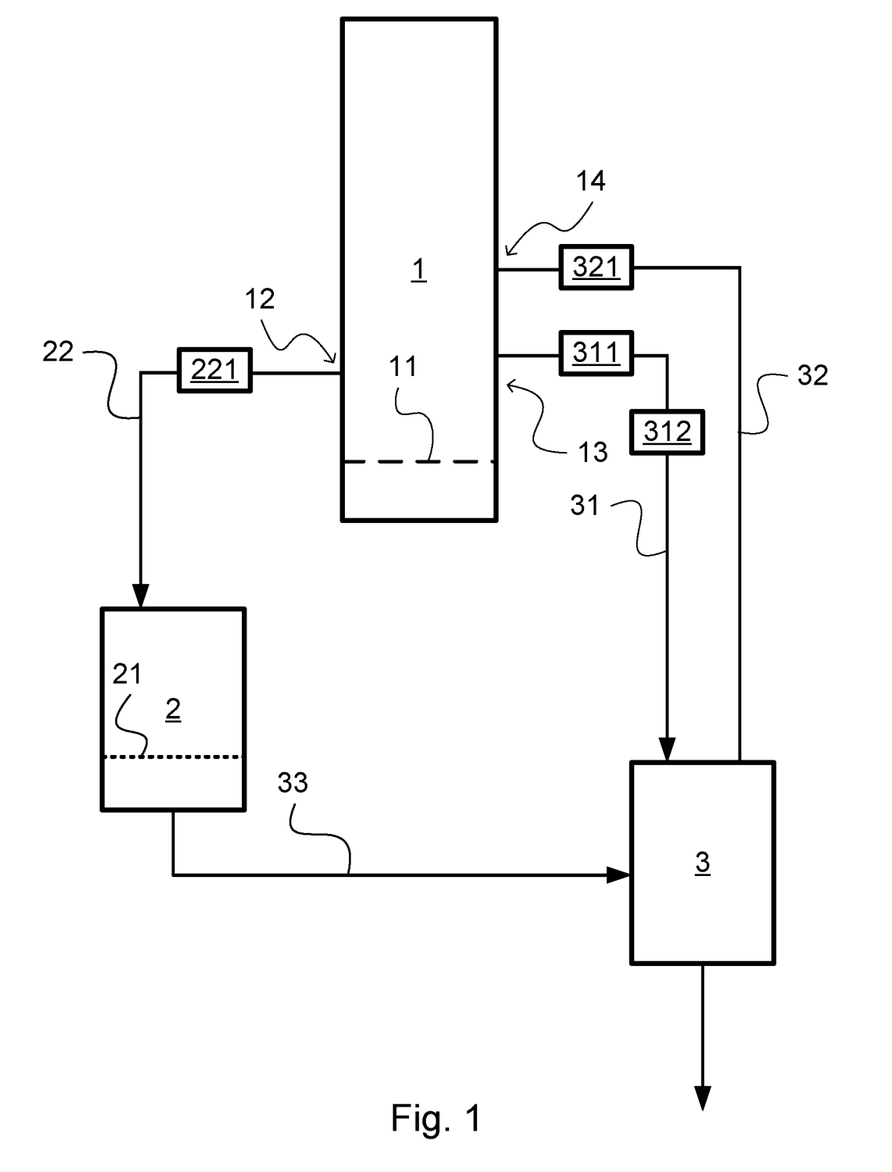
FIG. 1 is a schematic drawing of a system and a process according to an embodiment of the invention.

According to an embodiment of the invention, the second passage 31 comprises a first heater 312. The first heater 312 is arranged to heat the second product stream after withdrawing the second product stream from the gas phase reactor 1 and before introducing the second product stream to the product receiver tank 3. For example, the first heater 312 is a heat exchanger. The purpose of the first heater 312 is to increase the hydrocarbon separation from the second product stream at a later stage. The first heater 312 is able to heat the second product stream up to a temperature of 110° C. This embodiment is illustrated in FIG. 1.

According to an embodiment of the invention, the process comprises heating the second product stream after withdrawing the second product stream from the gas phase reactor 1 and before feeding the second product stream to the product receiver tank 3. For example, heating of the second product stream is performed by the first heater 312.

Figure 2:
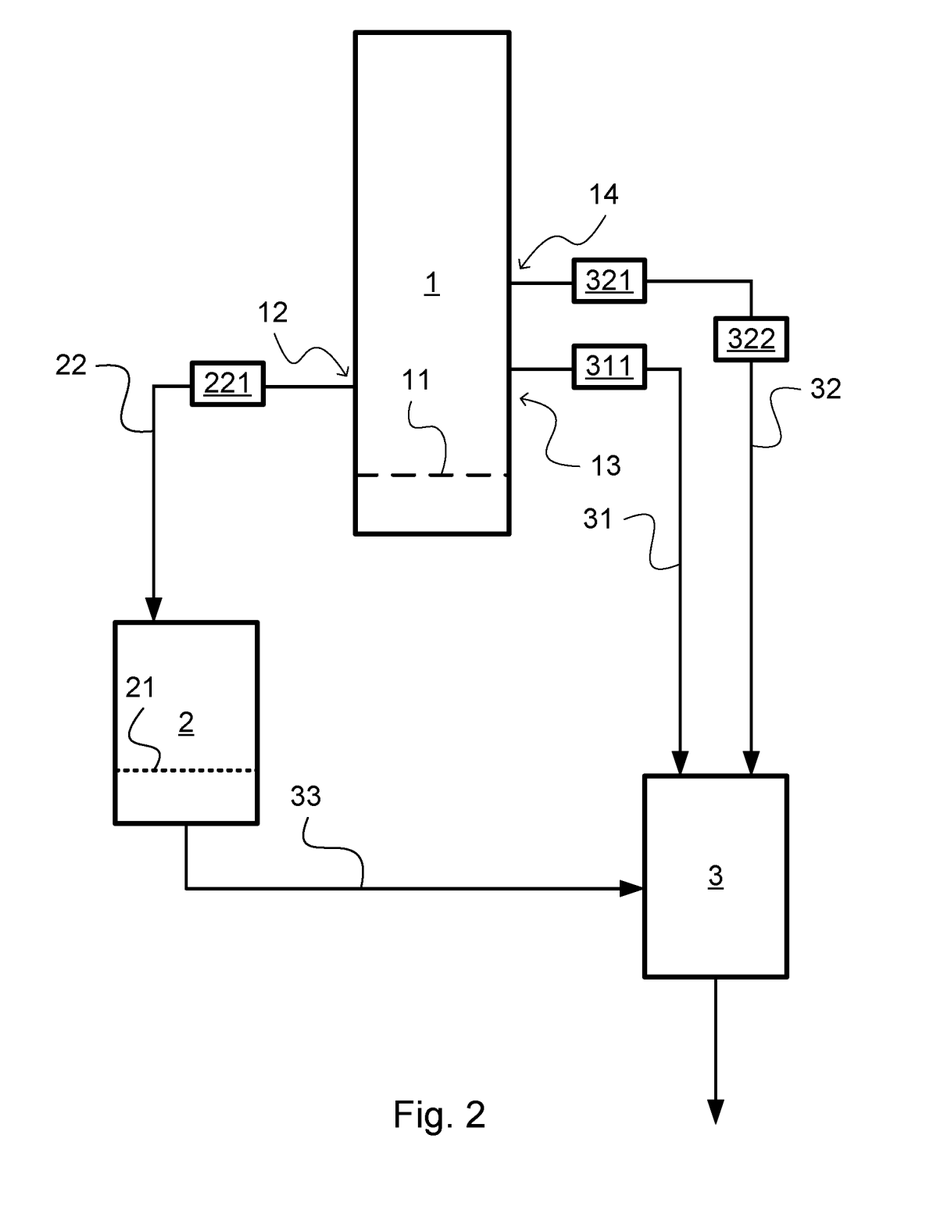
FIG. 2 is a schematic drawing of a system and a process according to an embodiment of the invention.

According to an embodiment of the invention, the third passage 32 comprises a second heater 322. The second heater 322 is arranged to heat the third product stream after withdrawing the third product stream from the gas phase reactor 1 and before introducing the third product stream to the product receiver tank 3. For example, the second heater 322 is a heat exchanger. The purpose of the second heater 322 is to increase the hydrocarbon separation from the third product stream at a later stage. The second heater 322 is able to heat the third product stream up to a temperature of 110° C. This embodiment is illustrated in FIG. 2.

According to an embodiment of the invention, the process comprises heating the third product stream after withdrawing the third product stream from the gas phase reactor 1 and before feeding the third product stream to the product receiver tank 3. For example, heating of the third product stream is performed by the second heater 322.

Figure 3:
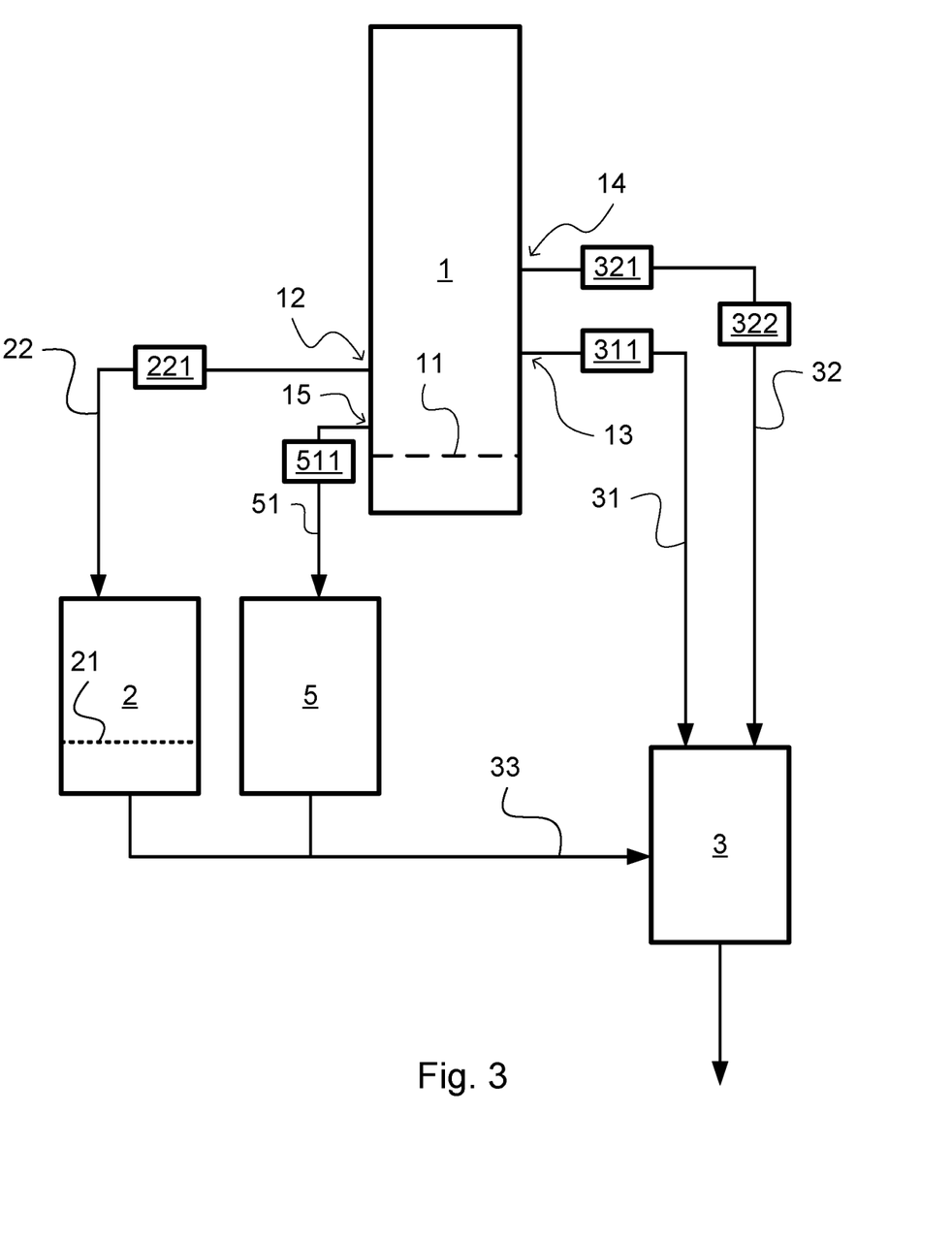
FIG. 3 is a schematic drawing of a system and a process according to an embodiment of the invention.

According to an embodiment of the invention, the polyolefin is polyethylene and the gas phase reactor 1 comprises a fourth outlet 15 for withdrawing a batch of the polymerization product from the gas phase reactor 1. This is to remove any chunks from the gas phase reactor 1. The fourth outlet 15 is arranged above the gas distribution plate 11 and below the first outlet 12. The distance between the fourth outlet 15 and the gas distribution plate 11 is preferably 1 to 17%, such as 2 to 10%, of the diameter of the gas phase reactor 1 at the level of the fourth outlet 15, or 0.05 to 0.5 m. According to this embodiment, the system comprises a second outlet tank 5. The fourth outlet 15 is in fluid communication with the second outlet tank 5 via a fourth passage 51. The second outlet tank 5 is arranged to receive the batch of the polymerization product.

The fourth passage 51 comprises a fourth valve means 511 for controlling the flow of the batch in the fourth passage 51. The control means is in communication with the fourth valve means 511. The control means is arranged to control the operation of the first valve means 221, the second valve means 311, the third valve means 321 and the fourth valve means 511 so that flow in only one of the first passage 22, the second passage 31, the third passage 32 and the fourth passage 51 is allowed at a time. In other words, the control means ensure that only one of the first valve means 221, the second valve means 311, the third valve means 321 and the fourth valve means 511 is in an open position at a time and that the other of the first valve means 221, the second valve means 311, the third valve means 321 and the fourth valve means 511 is in a closed position. Also in this embodiment, the purpose of the control means is to ensure that a product stream or a batch is withdrawn through only one outlet at a time. According to an embodiment, the control means is arranged to control the operation of the fourth valve means 511 so that the fourth valve means 511 is in open position only for a predetermined period. Preferably, the predetermined period is such that about 500 kg of polymer product is withdrawn from the polymerization reactor 1. According to an embodiment, the fourth outlet 15 or the fourth passage 51 is equipped with a lump grinder to break any lumps withdrawn from the gas phase reactor 1.

According to an embodiment of the invention, the process comprises selectively
  withdrawing polymerization product from the gas phase reactor 1 via the first outlet 12 as a first product stream, feeding the first product stream to a first outlet tank 2 and concentrating the first product stream in the first outlet tank 2;
  withdrawing polymerization product from the gas phase reactor 1 via the second outlet 13 as a second product stream and feeding the second product stream to a product receiver tank 3;

withdrawing polymerization product from the gas phase reactor 1 via the third outlet 14 as a third product stream and feeding the second product stream to a product receiver tank 3; or withdrawing a batch of the polymerization product from the gas phase reactor 1 via the fourth outlet 15 and feeding the batch to the second outlet tank 5.

The selective withdrawal of polymerization product via the first outlet 12, the second outlet 13, the third outlet 14 or the fourth outlet 15 is enabled by the control means.

The invention claimed is:

1. A system for producing polyolefin, comprising a gas phase reactor (1) for polymerizing an olefin to obtain polymerization product, the gas phase reactor (1) comprising
    a gas distribution plate (11) arranged inside the gas phase reactor (1);
    a first outlet (12) for continuously withdrawing polymerization product from the gas phase reactor (1) as a first product stream, the first outlet (12) being arranged above the gas distribution plate (11); and
    a second outlet (13) for continuously withdrawing polymerization product from the gas phase reactor (1) as a second product stream, the second outlet (13) being arranged above the gas distribution plate (11);
wherein the system further comprises
    a first outlet tank (2) in fluid communication with the first outlet (12) via a first passage (22), wherein the first passage (22) comprises a first valve means (221) for controlling the flow of the first product stream in the first passage (22) and wherein the first outlet tank (2) is arranged to receive the first product stream and to concentrate the first product stream;
    a product receiver tank (3) in fluid communication with the second outlet (13) via a second passage (31), wherein the second passage (31) comprises a second valve means (311) for controlling the flow of the second product stream in the second passage (31), and wherein the product receiver tank (3) is arranged to receive the second product stream; and
    a control means in communication with the first valve means (221) and the second valve means (311) and arranged to control the operation of the first valve means (221) and the second valve means (311) so that flow in only one of the first passage (22) and the second passage (31) is allowed at a time,
wherein
    the gas phase reactor (1) comprises a third outlet (14) for continuously withdrawing polymerization product from the gas phase reactor (1) as a third product stream, the third outlet (14) being arranged above the second outlet (13);
    the product receiver tank (3) is in fluid communication with the third outlet (14) via a third passage (32) and arranged to receive the third product stream;
    the third passage (32) comprises a third valve means (321) for controlling the flow of the third product stream in the third passage (32);
    the control means is in communication with the third valve means (321); and
    the control means is arranged to control the operation of the first valve means (221), the second valve means (311) and the third valve means (321) so that flow in only one of the first passage (22), the second passage (31) and the third passage (32) is allowed at a time.

2. A system according to claim 1, wherein the second passage (31) comprises a first heater (312) arranged to heat the second product stream.

3. A system according to claim 1, wherein the third passage (32) comprises a second heater (322) arranged to heat the third product stream.

4. A system according to claim 1, wherein the first outlet tank (2) comprises a screen (21) for removing agglomerates from the first product stream.

5. A system according to claim 1, wherein the polyolefin is polypropylene.

6. A system according to claim 1, wherein the polyolefin is polyethylene.

7. A system according to claim 6, wherein
    the gas phase reactor (1) comprises a fourth outlet (15) for withdrawing a batch of the polymerization product from the gas phase reactor (1), the fourth outlet (15) being arranged above the gas distribution plate (11) and below the first outlet (12);
    the system comprises a second outlet tank (5) in fluid communication with the fourth outlet (15) via a fourth passage (51) and arranged to receive the batch of the polymerization product;
    the fourth passage (51) comprises a fourth valve means (511) for controlling the flow of the batch in the fourth passage (51);
    the control means is in communication with the fourth valve means (511); and
    the control means is arranged to control the operation of the first valve means (221), the second valve means (311), the third valve means (321) and the fourth valve means (511) so that flow in only one of the first passage (22), the second passage (31), the third passage (32) and the fourth passage (51) is allowed at a time.

8. A process for recovering polymerization product from a gas phase reactor (1), the gas phase reactor (1) being suitable for polymerizing an olefin to obtain polymerization product and comprising
    a gas distribution plate (11) arranged inside the gas phase reactor (1);
    a first outlet (12) for continuously withdrawing polymerization product from the gas phase reactor (1), the first outlet (12) being arranged above the gas distribution plate (11); and
    a second outlet (13) for continuously withdrawing polymerization product from the gas phase reactor (1), the second outlet (13) being arranged above the gas distribution plate (11);
wherein the process comprises selectively
    withdrawing polymerization product from the gas phase reactor (1) via the first outlet (12) as a first product stream, feeding the first product stream to a first outlet tank (2), and concentrating the first product stream in the first outlet tank (2); or
    withdrawing polymerization product from the gas phase reactor (1) via the second outlet (13) as a second product stream, and feeding the second product stream to a product receiver tank (3),
wherein
the gas phase reactor (1) comprises a third outlet (14) for continuously withdrawing polymerization product from the gas phase reactor (1), the third outlet (14) being arranged above the second outlet (13); and
the process comprises selectively
    withdrawing polymerization product from the gas phase reactor (1) via the first outlet (12) as a first product stream, feeding the first product stream to a first outlet tank (2), and concentrating the first product stream in the first outlet tank (2);

withdrawing polymerization product from the gas phase reactor (1) via the second outlet (13) as a second product stream, and feeding the second product stream to a product receiver tank (3); or withdrawing polymerization product from the gas phase reactor (1) via the third outlet (14) as a third product stream, and feeding the third product stream to a product receiver tank (3).

9. A process according to claim 8, comprising heating the second product stream after withdrawing the second product stream from the gas phase reactor (1) and before feeding the second product stream to the product receiver tank (3).

10. A process according to claim 8, comprising heating the third product stream after withdrawing the third product stream from the gas phase reactor (1) and before feeding the third product stream to the product receiver tank (3).

11. A process according to claim 8, comprising removing agglomerates from the first product stream in the first outlet tank (2).

12. A process according to claim 8, wherein the polyolefin is polypropylene.

13. A process according to claim 8, wherein the polyolefin is polyethylene.

14. A process according to claim 13, wherein the gas phase reactor (1) comprises a fourth outlet (15) for withdrawing a batch of the polymerization product from the gas phase reactor (1), the fourth outlet (15) being arranged above the gas distribution plate (11) and below the first outlet (12); and the process comprises selectively withdrawing polymerization product from the gas phase reactor (1) via the first outlet (12) as a first product stream, feeding the first product stream to a first outlet tank (2), and concentrating the first product stream in the first outlet tank (2);

withdrawing polymerization product from the gas phase reactor (1) via the second outlet (13) as a second product stream, and feeding the second product stream to a product receiver tank (3);

withdrawing polymerization product from the gas phase reactor (1) via the third outlet (14) as a third product stream, and feeding the third product stream to a product receiver tank (3); or withdrawing a batch of the polymerization product from the gas phase reactor (1) via the fourth outlet (15), and feeding the batch to a second outlet tank (5).

* * * * *